Patented Dec. 21, 1926.

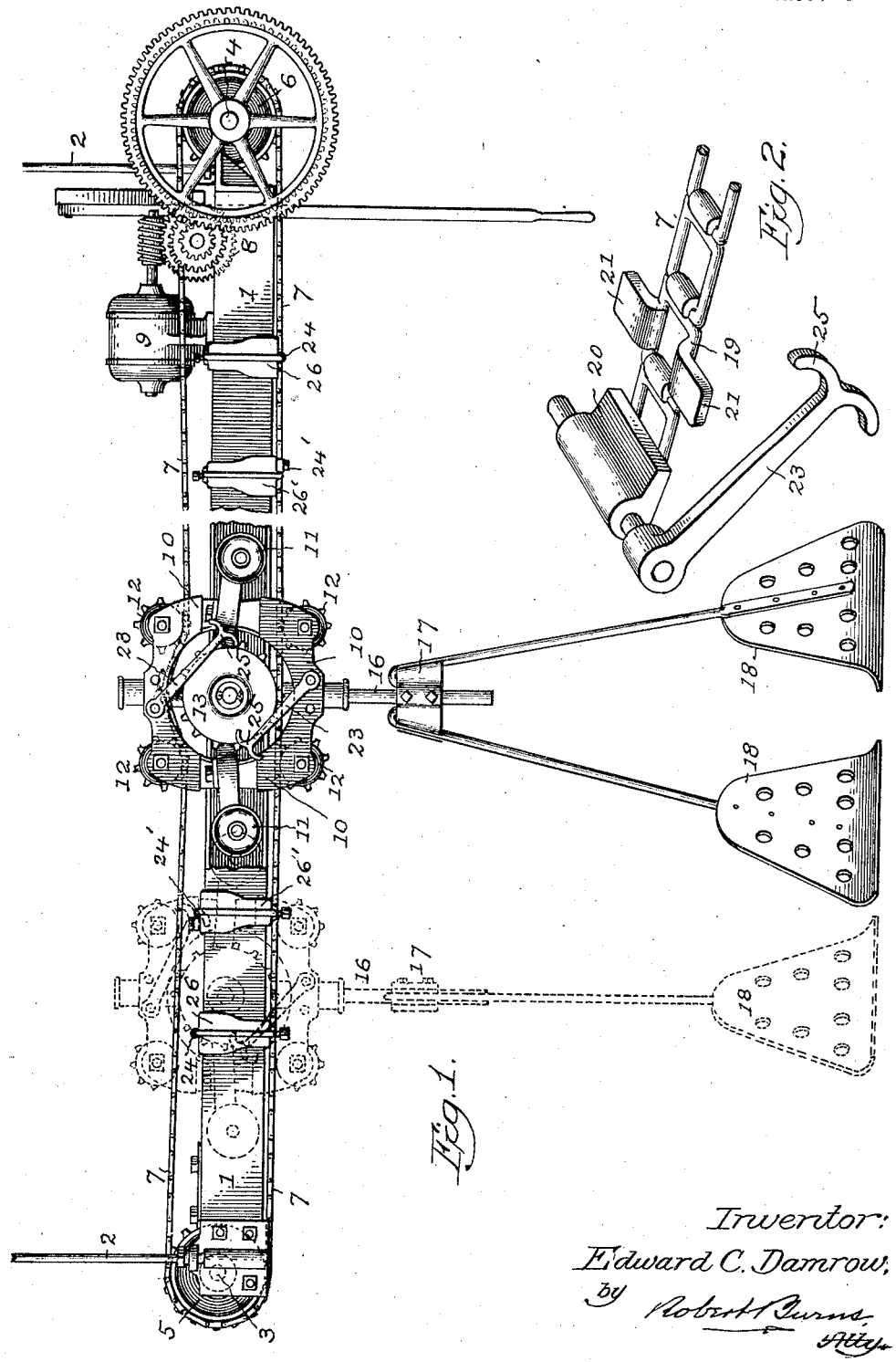

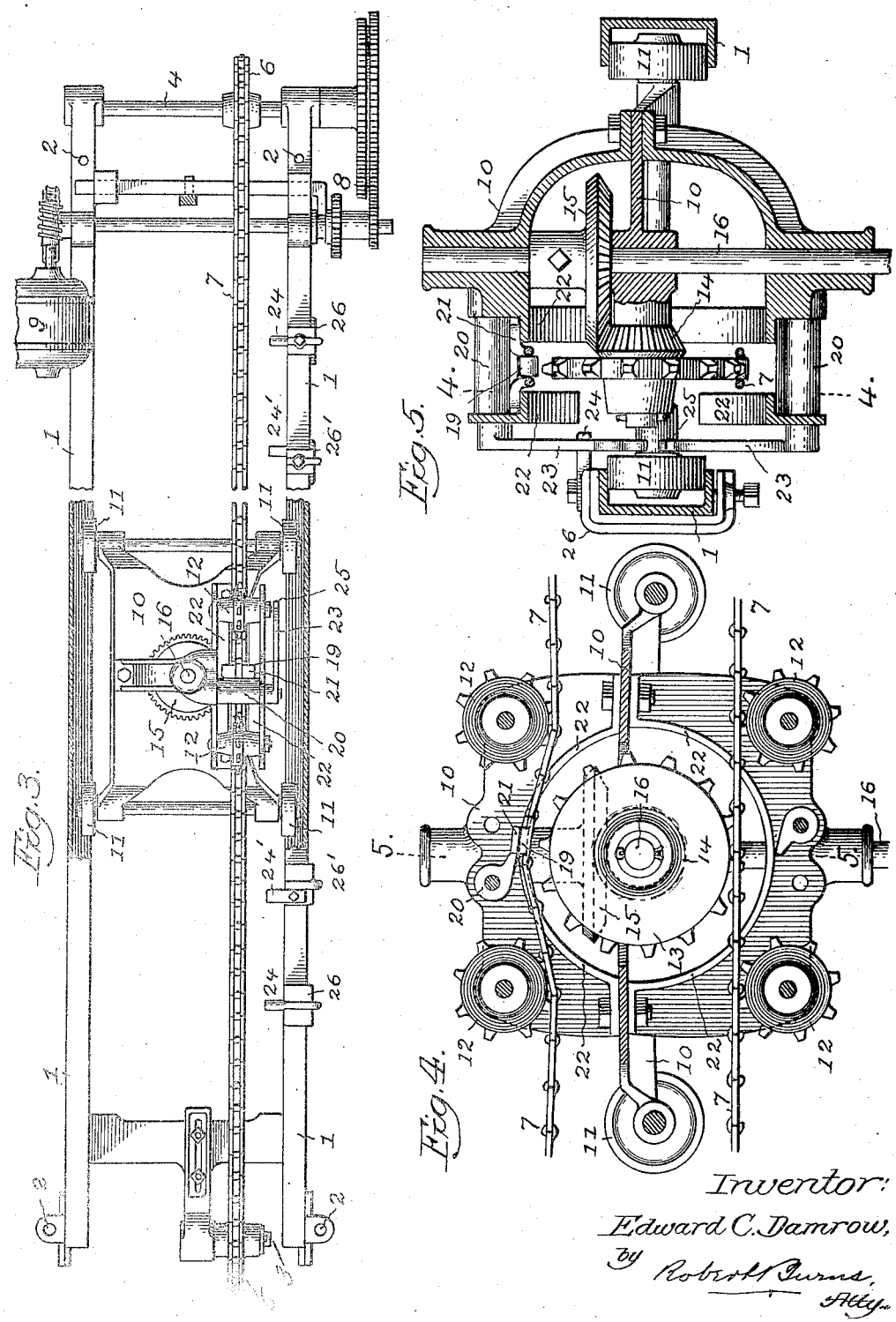

1,611,854

UNITED STATES PATENT OFFICE.

EDWARD C. DAMROW, OF FOND DU LAC, WISCONSIN, ASSIGNOR TO DAMROW BROTHERS COMPANY, OF FOND DU LAC, WISCONSIN, A CORPORATION OF WISCONSIN.

CURD AGITATOR.

Application filed March 12, 1926. Serial No. 94,124.

This invention relates to that type of curd agitators for cheese manufactories in which the rotary agitating or stirring means during a normal stirring action has a back and forth longitudinal travel in the contents of the usual elongated curd vat, and the present improvements have as their objects:

To provide a structural formation and combination of parts and elements whereby a simultaneous rotation and a back and forth travel is imparted to the stirring means in an effective manner and with a minimum expenditure of power in effecting an efficient agitation of the contents of the curd vat.

To provide means whereby the carrier or truck of the stirring means in its movement upon its horizontal supporting track is automatically released from operative connection with the driving means of the apparatus for a period of time during which the stirring means has continued rotation, and after the lapse of each period of rest of the carrier or truck, an automatic re-engagement of said truck and driving means is effected to cause a succeeding travel of the truck in a direction opposite to that of its preceding travel.

To provide means whereby the above mentioned period of rest of the carrier or truck can be varied in a ready and certain manner, all as will hereinafter more fully appear.

In the accompanying drawings:

Fig. 1, is a side elevation of a curd agitating mechanism embodying the present improvements.

Fig. 2, is a detail perspective view of a portion of the endless driving chain, with its engaging link, and one of the rocking pawls of the stirrer carrying truck and the operating arm of said pawl.

Fig. 3, is a top view of the mechanism.

Fig. 4, is a detail horizontal section on line 4—4, Fig. 5, of the stirrer carrying truck and the parts and mechanisms mounted thereon.

Fig. 5, is a detail transverse section of the same on line 5—5, Fig. 4.

Like reference numerals indicate like parts in the different views.

The supporting frame or trackway for the stirrer mechanism will in the present construction comprise track rails 1 of the channel form, secured together in fixed parallel relation and supported in a horizontal position a proper distance above a curd vat in any suitable manner, usually by suspension rods 2 depending from the ceiling of the vat room.

At the respective ends of the track rails 1, journal bearings are provided for transverse shafts 3 and 4, carrying sprocket wheels 5 and 6 which form the support for an endless chain 7 located between the track rails 1 and having a detail construction hereinafter described.

The shaft 3 of the sprocket wheel 5 is of the idler type, while the shaft 4 of the sprocket wheel 6 is of the driver type and to that end is operatively connected by a change speed gearing 8 with the shaft of a driving motor 9 usually mounted on the track rail 1 as shown.

The stirrer carrier or truck of the present apparatus comprises a frame 10 having track wheels 11 for rolling engagement in the channels of the track rails 1, in order to properly support and guide the truck in a horizontal plane and in a position intermediate of the track rails as shown.

At the respective upper and lower corners of the frame 10, idler sprocket wheels 12 are revolubly mounted for the purpose of holding the upper and lower longitudinal stretches of the endless chain 7 aforesaid in operative relation to a sprocket wheel 13 now to be described.

The sprocket wheel 13 above referred to is mounted on a stub shaft on the truck frame 10 in a position between the aforesaid stretches of the endless chain 7 so as to be capable of operative connection with both of said stretches during periods in the cycle of operations of the present mechanism as hereinafter more fully set forth.

A bevel gear wheel 14 is fixedly connected to the sprocket wheel 13 so as to rotate therewith, and has operative engagement with a companion bevel gear wheel 15, that is secured on a vertical shaft 16 journalled in the truck frame 10. The lower end of the shaft 16 depends a distance beneath said truck frame and near its lower end carries a head 17 for the attachment of a plurality of stirrer blades or wings 18 which may be of any ordinary and suitable form. With the above described combination of parts a constant rotation of the stirrer blades is attained during the entire actual operation of the apparatus in a simple and efficient manner, and regardless of the longitudinal location said stirrer blades may have in the usual elongated curd vat with which the mechanism is associated.

A material part of the present improvement involves means whereby the endless chain 7 aforesaid is automatically engaged with and automatically disengaged from operative engagement with the truck frame 10 aforesaid, in the attainment of a back and forth travel of the stirrer blades in the curd vat, with a period of stop in the movement of the stirrer carrying truck at each end of the vat so that additional stirring or agitation of the contents of the vat may be had at such points. To such end a construction and combination of parts as follows, is provided.

In the length of the endless chain 7, aforesaid, a link 19 is arranged. Said link is formed with a transverse portion which projects above the surface of the chain for operative engagement with one or the other of a pair of pivoted pawls 20 carried by the truck frame 10, and so that when said parts are in active engagement the truck frame 10 will move along in unison with the chain 7. In addition the link 19 is provided with lateral lugs 21 at its opposite sides, adapted to engage and ride upon one or the other of a pair of curved rails or ribs 22 forming a fixed part of the truck frame 10, and adapted to move said link 19 and along with it the adjacent portions of a stretch of the chain 7, out of engagement with the sprocket wheel 13 aforesaid and into the path of an adjacent pawl 20 for operative engagement therewith to attain a longitudinal travel of the truck frame and stirrer means mounted thereon.

Each of the pair of pawls 20, and pairs of curved rails 22 above referred to have opposed relation to each other in diametric relation to the axis of the sprocket wheel 13, so as to be in operative relation to the longitudinal stretches of the endless chain 7. The arrangement is such that while one stretch of the chain 7 is in driving engagement with the sprocket wheel 13, the other stretch of said chain will be moved out of engagement with said sprocket wheel by one or the other of the curved rails 22 for operative engagement with a next adjacent pawl 20 of the truck frame 10, and thus attain a simultaneous longitudinal travel of the truck and rotation of the stirring means mounted on said truck.

The above described operative engagement between a stretch of the endless chain 7 and the stirrer carrying truck is released as said truck nears an end of the curd vat in a longitudinal travel by releasing means as follows:—

A pair of oppositely disposed operating arms 23 are fixed on the carrying shafts of the pawls 20 aforesaid, in inclined positions and in the path of lateral operating studs or fingers 24 secured to the track rails 1 near their respective ends, so that as the truck frame 10 nears an end of a longitudinal travel an arm 23 will contact with and move upon the stud or finger 24 at such end of the tracks 1 to cause a movement of the pawl 20, then in engagement with the endless chain 7, out of such engagement.

With the described construction, the constant rotation of the stirrer mechanism continues, while the truck frame 10 stands at rest until the chain link 19 aforesaid passes around a sprocket wheel 5 or 6, and into an operative engagement with another of the pawls 20, to attain a travel of the truck frame and stirring mechanism in an opposite direction to that which previously prevailed.

Undue travel of the truck frame under inertia of motion is prevented by hook formations 25 on the ends of the aforesaid operating arms 23 coming into positive engagement with the stop studs or fingers 24 of the track rails 1.

In the construction shown in the drawings, the stop studs or fingers 24 aforesaid, are carried by attaching yokes 26 bolted in place on the track rails 1, and in the preferred arrangement of parts shown in Figs. 1 and 3 secondary stop studs or fingers 24' and carrying yokes 26' are adjustably secured in a readily removable manner to the track rails 1, adjacent to and adapted to act in lieu of the fixed stops 24 and carrying yokes 26, in shortening the travel of the truck frame 10 and stirring means carried by the same, when access, without interference, is needed to an end of the curd vat, during and near the end of the process.

Having thus fully described my invention, what I claim and desire to secure by Letters Patent, is:—

1. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same with its respective upper and lower stretches having operative engagement with said sprocket wheel, means for imparting continuous movement to said chain, and means for intermittently connecting said truck frame to said chain to attain a back and forth travel of the frame and a simultaneous disengagement of the adjacent stretch of the chain from the sprocket wheel.

2. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same, means for imparting continuous movement to said chain, and means for intermittently connecting said truck frame to said chain to attain a back and forth travel of the frame, the same comprising a pair of opposed pawls pivoted on said frame, a projecting link in the endless chain for successive operative engagement with said pawls, a pair of opposed curved rails on said frame for successive engagement with said link to move the same into the path of the pawls, opposed operating arms associated with said pawls, and operating studs on the trackway for successive operative engagement with said arms.

3. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same, means for imparting continuous movement to said chain, and means for intermittently connecting said truck frame to said chain to attain a back and forth travel of the frame, the same comprising a pair of opposed pawls pivoted on said frame, a projecting link in the endless chain for successive operative engagement with said pawls, a pair of opposed curved rails on said frame for successive engagement with said link to move the same into the path of the pawls, opposed operating arms associated with said pawls, and operating studs on the trackway for successive operative engagement with said arms, the inclined arms having hooks on their ends for stop engagement with said studs.

4. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same, means for imparting continuous movement to said chain, and means for intermittently connecting said truck frame to said chain to attain a back and forth travel of the frame, the same comprising a pair of opposed pawls pivoted on said frame, a projecting link in the endless chain for successive engagement with said pawls, a pair of opposed curved rails on said frame for successive engagement with said link to move the same into the path of the pawls, opposed operating arms associated with said pawls, a pair of main operating studs fixedly attached to the trackway, and a pair of supplementary operating studs removably secured to the trackway in adjacent relation to said fixed studs, the main and supplementary studs being arranged in the path of and having operative engagement with the aforesaid operating arms.

5. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same, idler sprocket wheels associated with the upper and lower corners of the truck frame for engagement with the endless chain to maintain the same in operative relation to the sprocket wheel carried by said frame, means for imparting continuous movement to said chain, and means for intermittently connecting said truck frame to said chain to attain a back and forth travel of the frame.

6. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same, idler sprocket wheels associated with the upper and lower corners of the truck frame for engagement with the endless chain to maintain the same in operative relation to the sprocket wheel carried by said frame, means for imparting continuous movement to said chain, and means for intermittently connecting said truck frame to said chain to attain a back and forth travel of the frame, the same comprising a pair of opposed pawls pivoted on said frame, a projecting link in the endless chain for successive operative engagement with said pawls, a pair of opposed curved rails on said frame for successive engagement with said link to move the same into the path of the pawls, opposed operating arms associated with said pawls, and operating studs on the trackway for successive operative engagement with said arms.

7. In an agitating mechanism of the type described, the combination of an overhead trackway, formed by a pair of channel rails secured together in spaced relation, a truck frame having movement in the channels of said rails, a vertical shaft journalled in said frame, a sprocket wheel journalled on said frame and having operative connection with said shaft, an endless chain mounted between the track rails and extending the length of the same with its respective upper and lower stretches having operative engagement with said sprocket wheel, means for imparting continuous movement of said chain, and means for intermittently connecting said truck frame to said chain to attain a back and forth travel of the frame and a simultaneous disengagement of the adjacent stretch of the chain from the sprocket wheel.

8. In an agitating mechanism of the type described, the combination of an overhead trackway formed by a pair of channel rails secured together in spaced relation, a truck frame having movement in the channels of said rails, a vertical shaft journalled in said frame, a sprocket wheel journalled on said frame and having operative connection with said shaft, an endless chain mounted between the track rails and extending the length of the same, means for imparting continuous movement to said chain, and means for intermittently connecting said truck frame to said chain to attain a back and forth travel of the frame, the same comprising a pair of opposed pawls pivoted on said frame, a projecting link in the endless chain for succesive operative engagement with said pawls, a pair of opposed curved rails on said frame for successive engagement with said link to move the same into the path of said pawls, operating arms associated with said pawls, and operating studs on the track rails for successive operative engagement with said arms.

9. In an agitating mechanism of the type described, the combination of an overhead trackway formed by a pair of channel rails secured together in spaced relation, a truck frame having movement in the channels of said rails, a vertical shaft journalled in said frame, a sprocket wheel journalled on said frame and having operative connection with said shaft, an endless chain mounted between the track rails and extending the length of the same, means for imparting continuous movement to said chain, and means for intermittently connecting said truck frame to said chain to attain a back and forth travel of the frame, the same comprising a pair of opposed pawls pivoted on said frame, a projecting link in the endless chain for successive operative engagement with said pawls, a pair of opposed curved rails on said frame for successive engagement with said link to move the same into the path of said pawls, operating arms associated with said pawls, and operating studs on the track rails for succesive operative engagement with said arms, the inclined arms having hooks on their ends for stop engagement with said studs.

10. In an agitating mechanism of the type described, the combination of an overhead trackway formed by a pair of channel rails secured together in spaced relation, a truck frame having movement in the channels of said rails, a vertical shaft journalled in said frame, a sprocket wheel journalled on said frame and having operative connection with said shaft, an endless chain mounted between the track rails and extending the length of the same, means for imparting continuous movement to said chain, and means for intermittently connecting said truck frame to said chain to attain a back and forth travel of the frame, the same comprising a pair of opposed pawls pivoted on said frame, a projecting link in the endless chain for successive operative engagement with said pawls, a pair of opposed curved rails on said frame for successive engagement with said link to move the same into the path of the pawls, opposed operating arms associated with said pawls, a pair of main operating studs fixedly attached to the track rails, and a pair of supplementary studs removably secured to the track rails in adjacent relation to said fixed studs, the main and supplementary studs being arranged in the path of and having operative engagement with the aforesaid operating arms.

11. In an agitating mechanism of the type described, the combination of an overhead trackway formed by a pair of channel rails secured together in spaced relation, a truck frame having movement in the channels of said rails, a vertical shaft journalled in said frame, a sprocket wheel journalled on said frame and having operative connection with said shaft, an endless chain mounted between the track rails and extending the length of the same, means for imparting continuous movement to said chain, idler sprocket wheels associated with the upper and lower corners of the truck frame for engagement with the endless chain to maintain the same in operative relation to the sprocket wheel carried by said frame, and means for intermittently connecting said truck frame to said chain to attain a back and forth travel of the frame.

12. In an agitating mechanism of the type described, the combination of an overhead trackway formed by a pair of channel rails secured together in spaced relation, a truck frame having movement in the channels of said rails, a vertical shaft journalled in said frame, a sprocket wheel journalled on said frame and having operative connection with said shaft, an endless chain mounted between the track rails and extending the length of the same, means for imparting continuous movement to said chain, idler sprocket wheels associated with the upper and lower corners of the truck frame for engagement with the endless chain to maintain the same in operative relation to the sprocket wheel carried by said frame, and means for intermittently connecting said truck frame to said chain to attain a back and forth travel of the frame, the same comprising a pair of opposed pawls pivoted on said frame, a projecting link in the endless chain for successive operative engagement with said pawls, a pair of opposed curved rails on said frame for successive engagement with said link to move the same into the path of the pawls, opposed operating arms associated with said pawls, and operating studs on the track rails for successive operative engagement with said arms.

13. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same, means for imparting continuous movement to said chain, and means for intermittently connecting said truck frame to said chain to attain a back and forth travel of the frame, the same comprising a pair of opposed pawls pivoted on said frame, a link in said chain formed with lateral lugs, a pair of opposed curved rails on said frame for successive engagement with the lateral lugs of the chain link to move the same into the path of the pawls, opposed operating arms associated with said pawls, and operating studs on the trackway for successive engagement with said arms.

14. In an agitating mechanism of the type described, the combination of a horizontal overhead trackway, a truck frame having movement along said trackway, a vertical shaft journalled in said frame, a sprocket wheel journalled on said frame and having operative connection with said shaft, an endless chain mounted on said trackway and extending longitudinally of the same, means for imparting continuous movement to said chain, and means for intermittently connecting said truck frame to said chain to attain a back and forth travel of the frame, the same comprising a pair of opposed pawls pivoted on said frame, a link in said chain formed with lateral lugs, a pair of opposed curved rails on said frame for successive engagement with the lateral lugs of the chain link to move the same into the path of the pawls, opposed operating arms associated with said pawls, and operating studs on the trackway for successive operative engagement with said arms, the operating arms having hooks on their ends for stop engagement with said studs.

Signed at Fond du Lac, Wisconsin, this 3rd day of March, 1926.

EDWARD C. DAMROW.